R. D. KNIGHT.
CONNECTOR FOR FLEXIBLE KEY RINGS.
APPLICATION FILED OCT. 2, 1914.
1,127,022.
Patented Feb. 2, 1915.
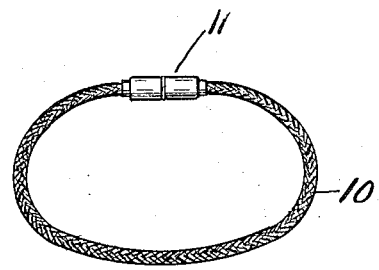
Fig. 1
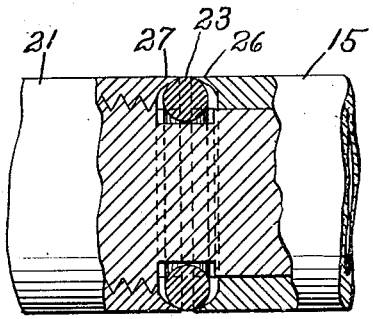
Fig. 2
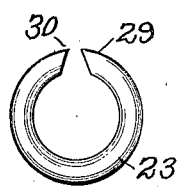
Fig. 8
Fig. 3
Fig. 6
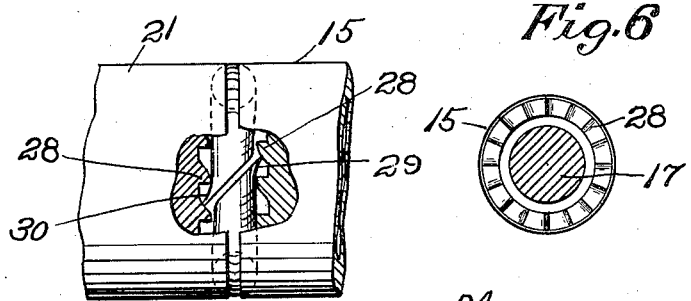
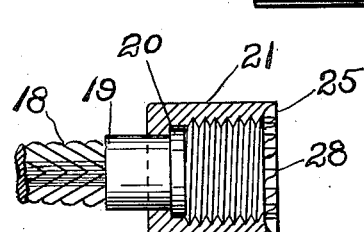
Fig. 4
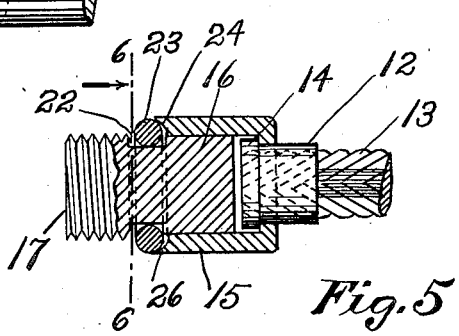
Fig. 5
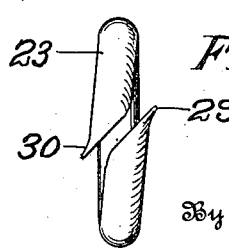
Fig. 7
Witnesses
W. W. Bardsley.
A. F. Macready.
Inventor
Richard D. Knight
By
Howard E. Barlow
Attorney

UNITED STATES PATENT OFFICE.

RICHARD D. KNIGHT, OF PROVIDENCE, RHODE ISLAND.

CONNECTOR FOR FLEXIBLE KEY-RINGS.

1,127,022.  Specification of Letters Patent.  Patented Feb. 2, 1915.

Application filed October 2, 1914. Serial No. 864,580.

*To all whom it may concern:*

Be it known that I, RICHARD D. KNIGHT, a citizen of the United States, and resident of the city of Providence, in the county of Providence and State of Rhode Island, have invented certain new and useful Improvements in Connectors for Flexible Key-Rings, of which the following is a specification.
This invention relates to connectors for the ends of flexible key rings and is an improvement on my prior Patent No. 674,775, and the object of the invention is to provide a connector for this purpose having two body portions, one being provided with a threaded hub to be secured into the other, and a split spring ring located between the two, having off-set ends to engage notches in the ends of the body portions for releasably securing the parts together.

A further object of the invention is to provide an annular groove in the threaded hub for the reception of the split ring, and also to under-cut the abutting ends of the body portions so that they will over-lap the ring and bind or compress the ring ends both laterally and radially to effectually force said ends into engagement with said notches.
With these and other objects in view, the invention consists of certain novel features of construction, as will be more fully described, and particularly pointed out in the appended claims.
In the accompanying drawings: Figure 1 illustrates the key ring showing my improved connector joining the two ends. Fig. 2 is a greatly enlarged view partly in section showing the abutting edges of the two body portions, also showing the locking ring as partly inclosed by the under-cut ends of said body members. Fig. 3 shows the end portions of the split locking ring and its manner of engaging the teeth in the under-cut portion of the body members. Fig. 4 is a smaller section showing the swivel connection of the flexible ring to the internally threaded body members. Fig. 5 is a sectional side elevation showing the swivel connection to the other body member the same being provided with a threaded hub by which the two members are connected together. Fig. 6 is an end view of the member shown in Fig. 5 looking in the direction of the arrow with the locking ring showing the radial teeth therein. Fig. 7 is an enlarged view of the locking split ring. Fig. 8 is a smaller view showing the engaging ends of the split ring as off-set radially from a perfect circle.

Referring to the drawings 10 designates the flexible key ring which may be of chain or other suitable flexible material, the ends of which are adapted to be joined together by the connector 11. In the construction of this connector I preferably form a collar 12 into which the end 13 of the chain is passed and connected by solder or otherwise. This collar is provided with a head 14, which is adapted to engage the inner shouldered end of the hollow or tubular member 15. In this member is secured, by solder or otherwise, the end 16 of the threaded hub 17. The opposite end 18 of the chain or flexible ring is connected to a similar collar 19 whose head 20 engages the inner end of the internally threaded connector body 21. These ends may be readily connected together by simply screwing this projecting hub 17 into the body 21, in which case it will be seen that both the collars 12 and 19 form swivels on which their body portions may be turned without kinking or twisting the chain.

It is found in the practical use of the old style connector that the constant movement of the ring, on which a number of keys are strung, while in the pocket of the user, oftentimes causes the connector members to loosen or become unscrewed and when the bunch is removed from the pocket the ring is liable to come apart and valuable keys slip off and become lost, to the great annoyance of the user. To obviate this very serious difficulty I have provided simple and effective means whereby these connector members are effectually locked or screwed together to prevent them from becoming inadvertently unscrewed and separated. To accomplish this, I have provided an annular recess 22 in the threaded hub into which a split spring ring 23 is passed by springing the same over the threaded portion. This recess as will be seen, permits the free action of this ring but at the same time prevents it from falling off when the parts are disconnected, and I also under-cut or concave the edges 24 and 25 of the opposite members 15 and 21 whereby when they are brought together the over-hanging lip portions 26 and 27 project over the ring 23 to partly inclose the same as presently described. Another reason for forming these teeth on the under-cut surfaces of these edges, is to prevent the teeth from showing on the outer edges of the members, which would render them rough and objectionable. One side or edge of the teeth is beveled off as illustrated in Fig. 3 to permit the ends of the ring to slide thereover when sufficient unscrewing strain is brought to bear upon the parts.

In the construction of my improved locking ring I off-set the ends 29 and 30 laterally, as indicated in Fig. 7, and also radially as indicated in Fig. 8, whereby when this ring is in position and the connector members 15 and 21 are screwed together the overhanging edges 26 and 27 will engage the ends of this ring and squeeze the same laterally and also radially inward, which action exerts a double locking or engaging effect on this ring to force its ends into the recess and effectually lock the members together to prevent them from inadvertently becoming disengaged one from the other.

By this construction the parts of my improved connector member may be locked together so that they will never become unscrewed, released and separated, except when considerable pressure is exerted by both hands upon the parts to unscrew the same. The force of this unscrewing action causes the ends 29 and 30 of the ring to pass over the rounded or beveled edges of the teeth 28 but effectually prevents the members from separating unless this unusual strain is exerted upon them.

I claim:

1. A connector for the ends of a flexible key ring comprising two body portions attached to the ring ends by swivel joints, one of said body portions being provided with an extending threaded hub adapted to be screwed into the opposite body portion, said hub being recessed about the edge of its body portion, the edges of said body portions being corrugated or notched and a split ring in said recess having off-set ends to engage said notches for the purpose of releasably securing the parts when screwed together.

2. A connector for the ends of a flexible key ring comprising two body portions attached to the ring ends by swivel joints, one of said body portions being provided with an extending threaded hub adapted to be screwed into the opposite body portion, said hub being recessed about the edge of one of the body portions, the edges of both of said body portions being under-cut and notched, and a split spring ring in said recess and partially inclosed in said under-cut portions, said ring having off-set ends to engage said notches to releasably lock the body portions together.

In testimony whereof I affix my signature in presence of two witnesses.

RICHARD D. KNIGHT.

Witnesses:
LOUISE L. BORDEN,
HOWARD N. KNIGHT.